US008965398B2

(12) United States Patent
Zhu et al.

(10) Patent No.: US 8,965,398 B2
(45) Date of Patent: Feb. 24, 2015

(54) BLUETOOTH BEACON BASED LOCATION DETERMINATION

(71) Applicant: Hewlett-Packard Development Company, L.P., Fort Collins, CO (US)

(72) Inventors: Jindan Zhu, Davis, CA (US); Kai Zeng, Dearborn, MI (US); Prasant Mohapatra, Davis, CA (US); Kyu Han Kim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 292 days.

(21) Appl. No.: 13/627,982

(22) Filed: Sep. 26, 2012

(65) Prior Publication Data

US 2014/0087752 A1 Mar. 27, 2014

(51) Int. Cl.
*H04W 24/00* (2009.01)
*H04B 7/00* (2006.01)
*H04B 17/00* (2006.01)
*H04W 4/00* (2009.01)

(52) U.S. Cl.
USPC ............ 455/456.1; 455/41.2; 455/115.3; 370/338

(58) Field of Classification Search
CPC ..... H04W 84/12; H04W 24/00; H04W 4/008; G01S 1/00; G01S 5/00; G01S 5/0045; G01S 5/0063; G01S 5/0257; H04B 17/00; H04B 17/0042; H04B 17/0057
USPC ............ 455/41.1–41.2, 115.1–115.3, 404.2, 455/414.1–414.2, 456.1–457; 370/338; 342/450–451
See application file for complete search history.

(56) References Cited

U.S. PATENT DOCUMENTS

| 7,257,411 | B2* | 8/2007 | Gwon et al. ............. 455/456.1 |
| 8,175,617 | B2 | 5/2012 | Rodriguez |
| 2008/0227467 | A1* | 9/2008 | Barnes et al. ............ 455/456.2 |
| 2008/0248801 | A1* | 10/2008 | Fletcher et al. ........... 455/435.2 |
| 2010/0248640 | A1* | 9/2010 | MacNaughtan et al. ... 455/67.11 |
| 2011/0117924 | A1* | 5/2011 | Brunner et al. ........... 455/456.1 |
| 2011/0286437 | A1* | 11/2011 | Austin et al. .................. 370/338 |

(Continued)

FOREIGN PATENT DOCUMENTS

WO    WO-2012065184    5/2012

OTHER PUBLICATIONS

Ciprian-Mihai Balas, "Indoor Localization of Mobile Devices for a Wireless Monitoring System Based on Crowdsourcing",University of Edinburgh, 2011, http://www.inf.ed.ac.uk/publications/thesis/online/IM110986.pdf.

(Continued)

*Primary Examiner* — Michael Mapa
(74) *Attorney, Agent, or Firm* — Ola Adekunle

(57) ABSTRACT

Examples disclosed herein relate to utilizing Bluetooth beacons for location determination of a mobile device. A Wi-Fi signal scan and a Bluetooth beacon scan are initiated at the mobile device. A location of the mobile device is determined based on at least on at least one Bluetooth beacon detectable by the mobile device, where the at least one Bluetooth beacon is transmitted from a first location, and where the first location is the location of the mobile device. A user of the mobile device is prompted for location information input, in response to determining that no Bluetooth beacons are detectable by the mobile device or when the at least one Bluetooth beacon detected is determined to be transmitted from a second location different from the location of the mobile device.

23 Claims, 7 Drawing Sheets

(56) References Cited

U.S. PATENT DOCUMENTS

| | | | | |
|---|---|---|---|---|
| 2011/0306354 A1* | 12/2011 | Ledlie et al. | ................ | 455/456.1 |
| 2012/0003932 A1* | 1/2012 | Zhodzishsky | ................ | 455/41.2 |
| 2012/0088532 A1* | 4/2012 | Thomas et al. | ................ | 455/509 |
| 2012/0122396 A1* | 5/2012 | Ha | ................ | 455/41.1 |

OTHER PUBLICATIONS

Thomas Graf, "Power-efficient Positioning Technologies for Mobile Devices", Berlin University of Technology, Jul. 13, 2012, http://www.snet.tu-berlin.de/fileadmin/fg220/courses/WS1112/snet-project/power-efficient-positioning-technologies_graf.pdf.

* cited by examiner

BLUETOOTH BEACON BASED LOCATION DETERMINATION

BACKGROUND

Location based services (LBS) have become increasingly popular and a considerable amount of research effort has been directed to developing indoor localization systems. Also, due to the rapid growth of smartphones, such localization systems adopt various techniques that use sensory capabilities provided by the smartphones. For example, crowd-sourced Wi-Fi-based localization systems utilize user input for radio frequency (RF) scene analysis and map construction. Such crowd-sourced localization systems require sufficient contributions from users to populate the signal map.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
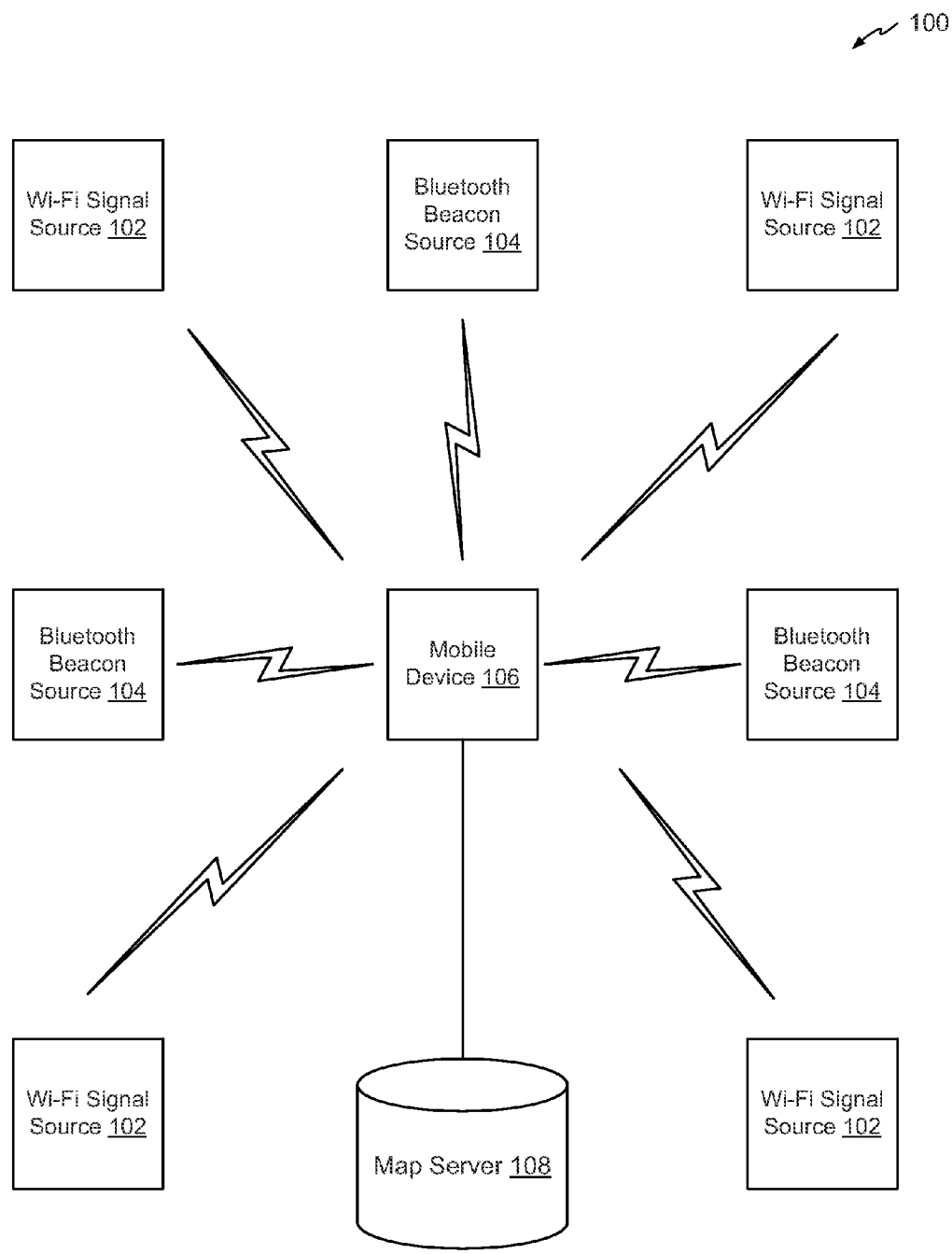
FIG. 1 is a schematic diagram illustrating an example environment in which the various examples may be implemented.

Crowd-sourced Wi-Fi-based localization systems utilize user input for RF scene analysis and map construction to determine a location of a mobile device indoors, for example. Such systems may reduce the deployment cost and privacy concerns that expert-based site survey systems can create. However, the main bottleneck with such crowd-sourced localization systems is a bootstrapping stage, where lack of contribution by users of the mobile devices results in no accuracy guarantee and frequent unnecessary prompting for user's input (i.e., location information input), even for explored areas.

Accordingly, examples disclosed herein address the insufficient contribution challenge, the unnecessary user prompting, and the low accuracy of Wi-Fi-based localization systems. The disclosed examples use both Wi-Fi scene analysis and Bluetooth beacons to address the above challenges. After prompting for user input (e.g., if no Bluetooth beacons are detectable or a location of the mobile device is unknown—unexplored area), the mobile device not only submits Wi-Fi fingerprint information to a map server, but also enables Bluetooth beacons to disseminate/share its location and fingerprint information to quickly populate the signal map. For example, the location information and signal metrics corresponding to Wi-Fi observations and Bluetooth beacon observations may be encoded into a new Bluetooth beacon to be transmitted to other users (e.g., a new user) within range of the transmitting mobile device. Thus, subsequent user mobile devices entering the area can discover the Bluetooth beacons and are able to instantly obtain room-level location information without causing unnecessary prompting to users. Accordingly, signal map growth may be improved, while maintaining localization accuracy and improving user experience.

In one example, Wi-Fi signal scan and Bluetooth beacon scan are initiated at a mobile device. A location of the mobile device is determined based on at least one Bluetooth beacon detectable by the mobile device. Location determination at the mobile device may include distinguishing between a first Bluetooth beacon transmitted from a first location and a second Bluetooth beacon transmitted from a second location, where the first location is the location of the mobile device. When there are no Bluetooth beacons detectable by the mobile device or when the at least one detectable Bluetooth beacon is the second Bluetooth beacon (e.g., a Bluetooth beacon located at a different location from the mobile device—a different room), it is determined that the location of the mobile device is unknown and a user of the mobile device is prompted for location information input.

In another example, a Wi-Fi module of a mobile device initiates a Wi-Fi signal scan. Similarly, a Bluetooth module of the mobile device initiates a Bluetooth beacon scan. A location determining module of the mobile device determines a location of the mobile device based on at least one Bluetooth beacon detectable by the Bluetooth module. The location determining module determines the location of the mobile device based on a determination that the at least one Bluetooth beacon detected is transmitted from a first location which is the location of the mobile device (e.g., the same room as the mobile device). In response to determining that no Bluetooth beacons are detectable by the Bluetooth module or that the at least one Bluetooth beacon detected is transmitted from a second location (i.e., a location different from the location of the mobile device), the location determining module prompts a user of the mobile device for location information input.

In another example, a non-transitory computer readable medium includes instructions that when executed by a processor cause the processor to initiate a Wi-Fi signal scan and a Bluetooth beacon scan at a mobile device. The instructions cause the processor to determine a location of the mobile device based on at least one Bluetooth beacon detectable by the mobile device. The at least one beacon is determined to be transmitted from a first location, where the first location is the location of the mobile device. The instructions further cause the processor to generate a location input prompt at a user interface of the mobile device in response to determining that no Bluetooth beacons are detectable by the mobile device or in response to determining that the at least one Bluetooth beacon is transmitted from a second location, where the second location is not the location of the mobile device.

It is appreciated that examples described herein below may include various components and features. Some of the components and features may be removed and/or modified without departing from a scope of the method, system, and non-transitory computer readable medium for Bluetooth beacon based location determination. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

Referring now to FIG. 1, a schematic diagram illustrating an example environment in which various examples may be implemented is described. Environment 100 includes, for example, a plurality of Wi-Fi signal sources 102 and a plurality of Bluetooth beacon sources 104 transmitting Wi-Fi signals and Bluetooth beacons, respectively, that may be received by a mobile device 106. Mobile device 106 may be communicatively coupled to a map server 108 to receive Wi-Fi based location information and/or to send location information (e.g., location information contribution) to the map server 108 for scene analysis and signal map construction.

Wi-Fi signal sources 102 may include Wi-Fi access points detectable by the mobile device 102. Bluetooth beacon sources 104 may include a plurality of wireless devices (e.g., other mobile devices 106) transmitting Bluetooth beacons encoded with location information useful for determining a location of the mobile device 106. Further, one or more of the Wi-Fi signal sources 102 and the Bluetooth beacon sources 104 may be located in the same room as the mobile device 106. For example, room-level accuracy (e.g., a particular room of the mobile device 106) may be determined based on one or more Bluetooth beacons transmitted from Bluetooth beacon sources in the same room as the mobile device 106. However, one or more of the Wi-Fi signal sources 102 and the Bluetooth beacon sources 104 may be located in rooms different from the mobile device 106. Mobile device 106 is configured to discriminate between one or more Bluetooth beacons transmitted from a different room from the mobile device 106 (e.g., penetrating beacons) and one or more Bluetooth beacons transmitted from the same room as the mobile device 106.

Mobile device 106 may include a smartphone, a mobile phone, a personal digital assistant (PDA), a portable personal computer, a desktop computer, a multimedia player, an entertainment unit, a data communication device, a portable reading device, or any combination thereof equipped with Bluetooth module 206 and Wi-Fi module 236. Map server 106 may include and/or may be a database for storing and generating location information, signal map, and Wi-Fi fingerprint. For example, once the user of mobile device 106 is prompted for location information input, besides adding the location information to the signal map server 106, users may also choose to encode the location information and current Wi-Fi signal observations into a Bluetooth beacon. Subsequent user devices entering the same location may scan for Bluetooth beacon(s). If beacon(s) are found, the mobile device 106 may be localized instantly with high accuracy. If however, beacons are not found, the user may be prompted for location information to improve coverage or the mobile device 106 may resort to Wi-Fi-based localization using maps (e.g., from map server 108) built by previous users.

Figure 2:
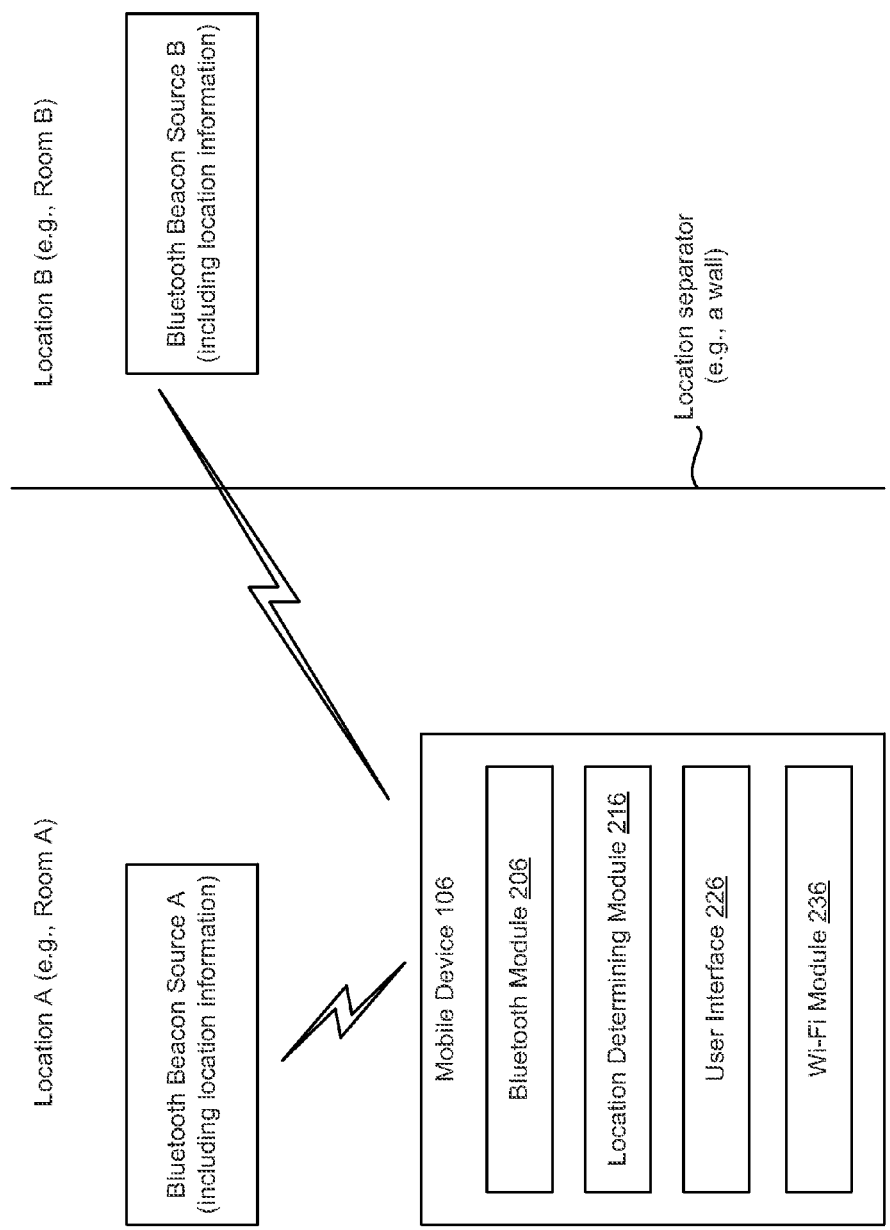
FIG. 2 is a schematic diagram illustrating a mobile device configured to implement Bluetooth beacon based location determination, according to one example.

Attention is now directed to FIG. 2, which illustrates a mobile device configured to implement Bluetooth beacon based location determination, according to one example. FIG. 2 includes mobile device 106 in Location A, Bluetooth beacon source A in Location A, and Bluetooth beacon source B in Location B, where Location A and Location B are separated by a wall, for example. To illustrate, Location A may be a first room in which the mobile device 106 and Bluetooth beacon source A are located, and Location B may be a second room (e.g., a neighboring or adjacent room to the first room) in which Bluetooth beacon source B is located.

Mobile device 106 may include a Bluetooth module 206, a location determining module 216, a user interface 226, and a Wi-Fi module 236, for example. Wi-Fi module 236 may be configured to initiate a scan for Wi-Fi signals transmitted from one or more Wi-Fi signal sources 102 such as Wi-Fi access points. Bluetooth module 206 may be configured to initiate a scan for Bluetooth beacons transmitted from one or more Bluetooth beacon sources 104. In one example, the Wi-Fi signal scan may be performed prior to or substantially concurrently with the Bluetooth beacon scan. Location determining module 216 may be configured to determine the location of the mobile device based on at least one Bluetooth beacon detectable by the Bluetooth module 206. For example, the location determining module 216 may determine that the at least one Bluetooth beacon is transmitted from a first location (e.g., Location A) which is the location of the mobile device 106. Further, the location determining module 216 may distinguish between a first Bluetooth beacon transmitted from the first location (e.g., Location A) and a second Bluetooth beacon transmitted from a second location (e.g., Location B), where the second location is different from the location of the mobile device 106 (e.g., a penetrating beacon from a neighboring room/location). The technique for distinguishing between the first beacon and the second beacon is described in further details with reference to FIGS. 3 and 4.

Location determining module 216 may further be configured to prompt the user of the mobile device 106 for location information input when there are no Bluetooth beacons detectable by the Bluetooth module 206 or when the Bluetooth beacon detected by the Bluetooth module 206 is determined to be the second Bluetooth beacon transmitted from the second location (i.e., different from the location of the mobile device). For example, the location determining module 216 may determine that a particular Bluetooth beacon is a penetrating beacon transmitted from a neighboring room/location and not from the same room/location as the mobile device 106. Accordingly, the user of the mobile device 106 may be prompted for location information input via a user interface 226 of the mobile device. User interface 226 may be configured to receive location information input from the user of mobile device 106. User interface 226 may be a keypad, a touchscreen, or any other type of user interface for receiving a user input at a mobile device.

Figure 3:
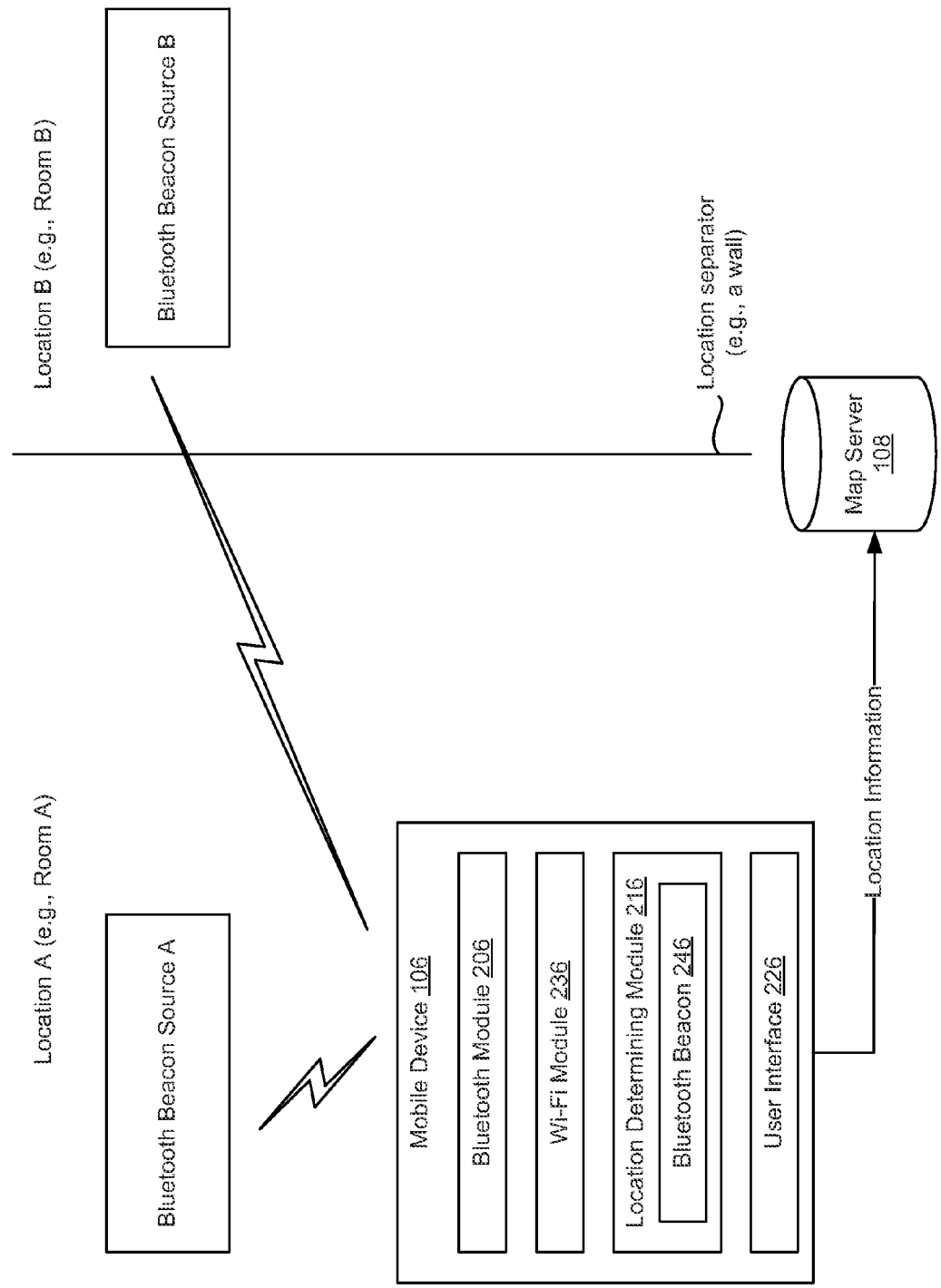
FIG. 3 is a schematic diagram illustrating a mobile device configured to implement Bluetooth beacon based location determination, according to one example.

FIG. 3 is a schematic diagram illustrating a mobile device configured to implement Bluetooth beacon based location determination, according to one example. FIG. 3 includes mobile device 106 and Bluetooth beacon source A in Location A. Bluetooth beacon source B may be located in and transmitting from Location B, where Location B is separated from Location A by a wall, for example. Mobile device 106 may be communicatively coupled to map server 108.

Mobile device 106 may include Bluetooth module 206, Wi-Fi module 236, location determining module 216, and user interface 226. Wi-Fi module 236 may be configured to initiate a scan for Wi-Fi signals from Wi-Fi signal sources 102 such as Wi-Fi access points. Location determining module 216 may generate Wi-Fi signal metrics based on the detected Wi-Fi signals. Bluetooth module 206 may be configured to initiate a scan for one or more Bluetooth beacons from Bluetooth beacon sources 104 such as mobile devices. Location determining module 216 may generate Bluetooth beacon metrics based on the detected Bluetooth beacons. Wi-Fi signal metrics and Bluetooth beacon metrics may include received signal strength indicator (RSSI) corresponding to the Wi-Fi signals and the Bluetooth beacons, respectively.

Location determining module 216 may be configured to distinguish between a beacon transmitted from the location of the mobile device 106 and a penetrating beacon (e.g., a beacon transmitted from a neighboring location) transmitted from a different location from the mobile device 106. For example, the location determining module 216 may be configured to generate a unified metric based on a combination the Wi-Fi RSSI and the Bluetooth beacon RSSI, where the unified metric is usable to distinguish between the penetrating Bluetooth beacon from a neighboring/adjacent room and a Bluetooth beacon from the same room as the mobile device 106. Thus, room-level accuracy of the mobile device may be achieved based on the unified metric. The unified metric is described in further detail with reference to FIG. 4.

Location determining module 216 may be configured to prompt the user of the mobile device 106 for location information input when there are no Bluetooth beacons detectable by the Bluetooth module 206 or when the detected Bluetooth beacon is a penetrating Bluetooth beacon. Once the location of the mobile device 106 is determined via Bluetooth beacon or user input, the location information may be shared with new users (i.e., new mobile devices 106) entering the location. For example, location information of the mobile device 106 may be encoded in a Bluetooth beacon for broadcasting. Location determining module 216 may be configured to generate a Bluetooth beacon 246 encoded with the location information of the mobile device 106. Thus, mobile device 106 may serve as a Bluetooth beaconing node transmitting location information for localizing new mobile devices entering the same location as the mobile device 106.

Bluetooth beacon 246 may include location information comprising fingerprints from Wi-Fi observations, Bluetooth beacons, or a combination thereof. Further, the location information from at least one of the Bluetooth and the user input may be sent to the map server 108 for signal map generation. Accordingly, the mobile device 106 may contribute location information to the map server 108 for scene analysis and map construction to provide a more robust signal map for localizing mobile devices entering the area.

Mobile device 106 may periodically perform the Wi-Fi scan and compare current Wi-Fi observations to historical Wi-Fi observations to determine whether the mobile device has relocated. For example, if a difference between current Wi-Fi observations and historical Wi-Fi observations exceeds a threshold, location determining module 216 may determine that the mobile device 106 has relocated or moved from its current location. Accordingly, the mobile device 106 may refrain from transmitting the Bluetooth beacon 246 and start re-localizing (i.e., begin the process of determining the new location).

By using Bluetooth beacon 246 for location determination, room-level accuracy may be achieved at a low cost due to the pervasiveness of Bluetooth modules 206 in most mobile devices 106. Further, Bluetooth beacons 246 facilitate the bootstrapping stage of crowd-sourced localization and reduce unnecessary user prompting, thereby improving user experience. Moreover, room-level accuracy with a high confidence level may be provided where only few fingerprints are available for a particular area and expedite the map construction process. In addition, leveraging Bluetooth beacons 246 to locally share location information may reduce the need for frequent communication with remote map server 108 for evolving updates, thereby reducing power consumption at mobile devices 106.

Figure 4:
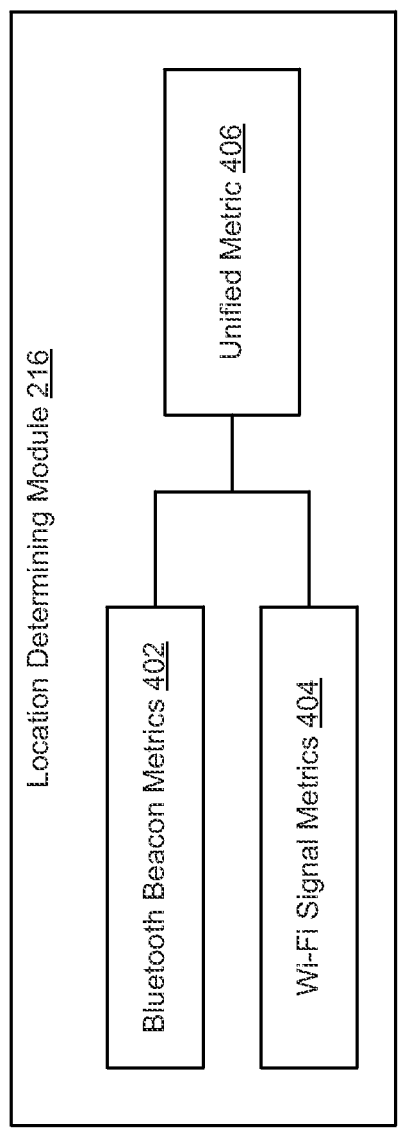
FIG. 4 is a schematic diagram illustrating a location determining module, according to various examples.

FIG. 4 is a schematic diagram illustrating a location determining module, according to various examples. Location determining module 216 may be configured to extract or generate Bluetooth beacon metrics 402 (e.g., Bluetooth beacon RSSI) from one or more Bluetooth beacons and Wi-Fi signal metrics 404 (e.g., Wi-Fi signal RSSI) from one or more Wi-Fi signals detected by Bluetooth module 206 and Wi-Fi module 236, respectively. Further, location determining module 216 may generate unified metric 406 based on a combination of the Bluetooth beacon RSSI and the Wi-Fi RSSI. Unified metric 406 is usable by location determining module 216 for distinguishing between a first Bluetooth beacon transmitted from the same room as mobile device 106 and a second Bluetooth beacon transmitted from a different room (e.g., a neighboring room) from the mobile device 106. The second Bluetooth beacon may be a penetrating Bluetooth beacon.

Bluetooth beacons may include Wi-Fi fingerprints encoded therein. Thus, a Bluetooth beacon may be encoded with a Wi-Fi fingerprint. A Wi-Fi fingerprint is a signal map for a given area created based on RSSI data from several access points and probability distribution of RSSI values for a given location. Real-time RSSI values are then compared to the fingerprint to find a closest match for predicting a location of the mobile device 106. Wi-Fi fingerprint may include, for example, a position descriptor, a list of visible access points and corresponding RSSI statistics, namely observation. When the mobile device 106 is localizing via Wi-Fi signals, Wi-Fi observation at an unknown location is collected and matched against reference fingerprints in the signal map 108. Wi-Fi localization is based on a distance metric (e.g., Root-Mean-Square-Error RMSE) and a classification technique (e.g., 1-Nearest-Neighbor (1-N-N)). The location determining module 216 is configured to generate a modified RMSE to improve localization performance.

When Wi-Fi module 236 issues consecutive Wi-Fi scans (e.g., 10 consecutive Wi-Fi scans), the location determining module 216 may calculate the mean and standard deviation of the reported RSSI values for each visible access point. The calculated values are stored as fingerprint along with a valid record count (i.e., the number of observations for each access point in the X-round-scan, where X is 10, for example). During the X-round-scan, a few RSSI values may drastically deviate from others, which may swing the mean. Such deviations may be caused by overheard signal (or interferences) from adjacent channels, for example, and are not true representations. Accordingly, clustering may be performed on the X-round-scan prior to averaging. The clustering excludes any RSSI value that differs by more than a threshold dBm (e.g., 30 dBm) from half of the other RSSI values.

Each fingerprint collected from different time and locations may include the list of different observed access points. Before applying the distance metric (i.e., RMSE) to the fingerprint for calculating the distance between observation and record, different fingerprints are formatted into such lists that consist of the same set of access points. For such normalization, a fusion step is implemented to examine all fingerprints and to generate an aggregated access point list. For access points that are not observed in certain fingerprints, their RSSI values are replaced with an "invalid" one (e.g., −100 dBm). Further, transient access points are accounted for when calculating/generating the modified RMSE. Transient access points temporarily appear on site-survey phase but disappear on localization phase, or vice versa. To avoid errors due to transient access points, a valid record count (w), which is defined as the ratio of record count over total scans (e.g., 10 total scans), as a weight factor for such access points. Thus, transient access points have very low valid record counts. Accordingly, the modified RMSE metric, a distance metric for Wi-Fi localization, is expressed as:

$$D_{om} = \sqrt{\frac{1}{c}\sum_{i=1}^{n} w_i(r_i^o - r_i^m)^2} \quad \text{Eq. 1}$$

where $D_{om}$ is a distance from observation o to fingerprint m, c is the number of access points observed by both observation o and fingerprint m, n is the total number of access points after fusion (i.e., clustering), $r_i^o$ represents RSSI value of ith access point in observation o, $r_i^m$ represents RSSI value of ith access point in fingerprint m, and $w_i$ is the valid record count of ith access point.

A threshold-based approach is defined for distinguishing (i.e., identifying/excluding) between penetrating Bluetooth beacons from and to an adjacent room. The threshold-based approach uses both RSSI of the Bluetooth beacons and the Wi-Fi fingerprints the beacon carries. It should be noted that RSSI of Bluetooth beacons exhibit characteristics to distinguish beacons between rooms and wall-type obstacles. Because the frequency band of Bluetooth is divided into 79 slots, during an inquiry process (i.e., a Bluetooth beacon scan), mobile device 106 may receive multiple responses from the same Bluetooth beacon node in more than one frequency slot and the corresponding RSSI values may be different. To account for this potential error/duplicity, the mean of all received RSSI values is calculated and the mean RSSI value is used as the received power for the Bluetooth beacon. Further, to account for potential instability of the wireless signal (e.g., as opposed to using an absolute threshold), the RSSI may be divided into three ranges, for example, and each range is assigned a penalty value for space discrimination, as shown in the table below (i.e., Table I).

|        | $-RSSI_b \leq 79$ | $79 < -RSSI_b \leq 83$ | $83 < -RSSI_b$ |
|--------|-------------------|------------------------|----------------|
| $p_b$  | 0                 | 0.5                    | 1              |
|        | $D_{ob} \leq 7$   | $7 < D_{ob} \leq 9$    | $9 < D_{ob}$   |
| $p_w$  | 0                 | 0.5                    | 1              |

The penalty values $p_b$ and $p_w$ for Bluetooth beacon RSSI and Wi-Fi RSSI, respectively, may be abstracted from empirical measurements. The unified metric 406 that jointly uses the RSSI of Bluetooth beacons and the Wi-Fi fingerprint carried by the beacons, is thus defined as follows:

$$U_{ob} = (1 + p_b) \cdot \left(\frac{-RSSI_b - 50}{N}\right) + (1 + p_w) \cdot (D_{ob}) \quad \text{Eq. 2}$$

where $U_{ob}$ is the unified distance from observation o to beacon fingerprint b, $RSSI_b$ is the RSSI value extracted from beacon b, $D_{ob}$ is the RMSE distance from observation o to beacon fingerprint b calculated using Eq. 1, $p_b$ is penalty value given to beacon RSSI component, $p_w$ is penalty value given to Wi-Fi RMSE component $D_{ob}$, and N is a constant (e.g., N=4) for normalizing $RSSI_b$ to the same scale as $D_{ob}$. When a Bluetooth beacon is received, RSSI of the beacon is extracted along with the Wi-Fi fingerprint it carries. With fingerprint from Bluetooth beacon and local Wi-Fi observation, RMSE distance from mobile device 106 to the Bluetooth beacon source (or node) is calculated according to Eq. 1. Based on the values and the empirical thresholds of Table I, penalty values are assigned to the beacon RSSI and Wi-Fi RMSE distance, respectively, as in Eq. 2.

Based on the unified metric 406 described above for discriminating between a penetrating beacon from an adjacent room and a beacon from the same room, a prompting policy may be developed for determining when a user of the mobile device 106 may be prompted for location information. The prompting policy may be defined by the following example code:

```
1:  INPUT: Local observation f gpt_o; Received beacon count bconcnt; Received beacon list
    bcon[bconcnt]; Minimal distance mindist; Maximum distance MAX_DIST; Distance
    Threshold THRESHOLD;
2:  OUTPUT: prompt = {TRUE, FALSE}
3:  INIT: mindist = MAX_DIST
4:  if bconcnt > 0 then
5:     for i = 1 to bconcnt do
6:        Extract f gpt_b^i, RSSI_b^i from bcon[i]
7:        D_ob^i = RMSE(f gpt_o, fgpt_b^i)
8:        Decide penalty values p_w^i, p_b^i
9:        U_ob^i = UM (RSSI_b^i, D_ob^i, p_w^i, P_b^i)
10:       if mindist > U_ob^i then
11:          mindist = U_ob^i
12:       end if
13:    end for
14: end if
15: if bconcnt == 0 then
16:    prompt = TRUE
17:    setbeacon(f gpt_o)
18: else if bconcnt == 1 then
19:    if mindist > THRESHOLD then
20:       prompt = TRUE
21:       setbeacon(f gpt_o)
22:    else
23:       prompt = FALSE
24:    end if
25: else
26:    if mindist > THRESHOLD then
27:       prompt = TRUE
```

```
28:      setbeacon(f gpt_o)
29;   else
30:      prompt = FALSE
31:   end if
32: end if
```

An example implementation Bluetooth beacon based location determination at the mobile device 106 may be defined by the following steps. First, a Wi-Fi scan is performed to collect local Wi-Fi signal observations. If Bluetooth capability is disabled in the mobile device 106, the mobile device may localize a device using Wi-Fi signals based on the modified RMSE of Eq. 1. If however, Bluetooth capability of the mobile device 106 is enabled, the mobile device 106 may start Bluetooth search for nearby Bluetooth beacons. In this scenario, the Bluetooth beacon search result determines whether the user prompting policy defined above is implemented. If one or more Bluetooth beacons are received, the mobile device identifies whether the one or more Bluetooth beacons is transmitted from neighboring rooms by using the unified metric 406 defined in Eq. 2 (i.e., code lines 4-14). If the one or more Bluetooth beacons are transmitted from the same room as the mobile device (i.e., non-penetrating Bluetooth beacons), the mobile device 106 uses the location information from the received one or more Bluetooth beacons for localization. If no Bluetooth beacon is within a range of the mobile device or if the value derived from the unified metric 406 is greater than a predefined threshold, the mobile device 106 considers the current location as an unexplored area and prompts the user for location input (i.e., code lines 15-25). Once the mobile device 106 receives the user input, the user may opt to enable Bluetooth beacons for subsequent users entering the same location (i.e., the same room). Further, the mobile device 106 may periodically perform Wi-Fi scan and compare current Wi-Fi observations to historical records (i.e., comparing current RMSE distances to historical RMSE distances). If a difference between the historical records and the current observations exceed a threshold, the mobile device 106 may stop beaconing and start re-localizing, because the mobile device 106 may have re-located.

Figure 5:
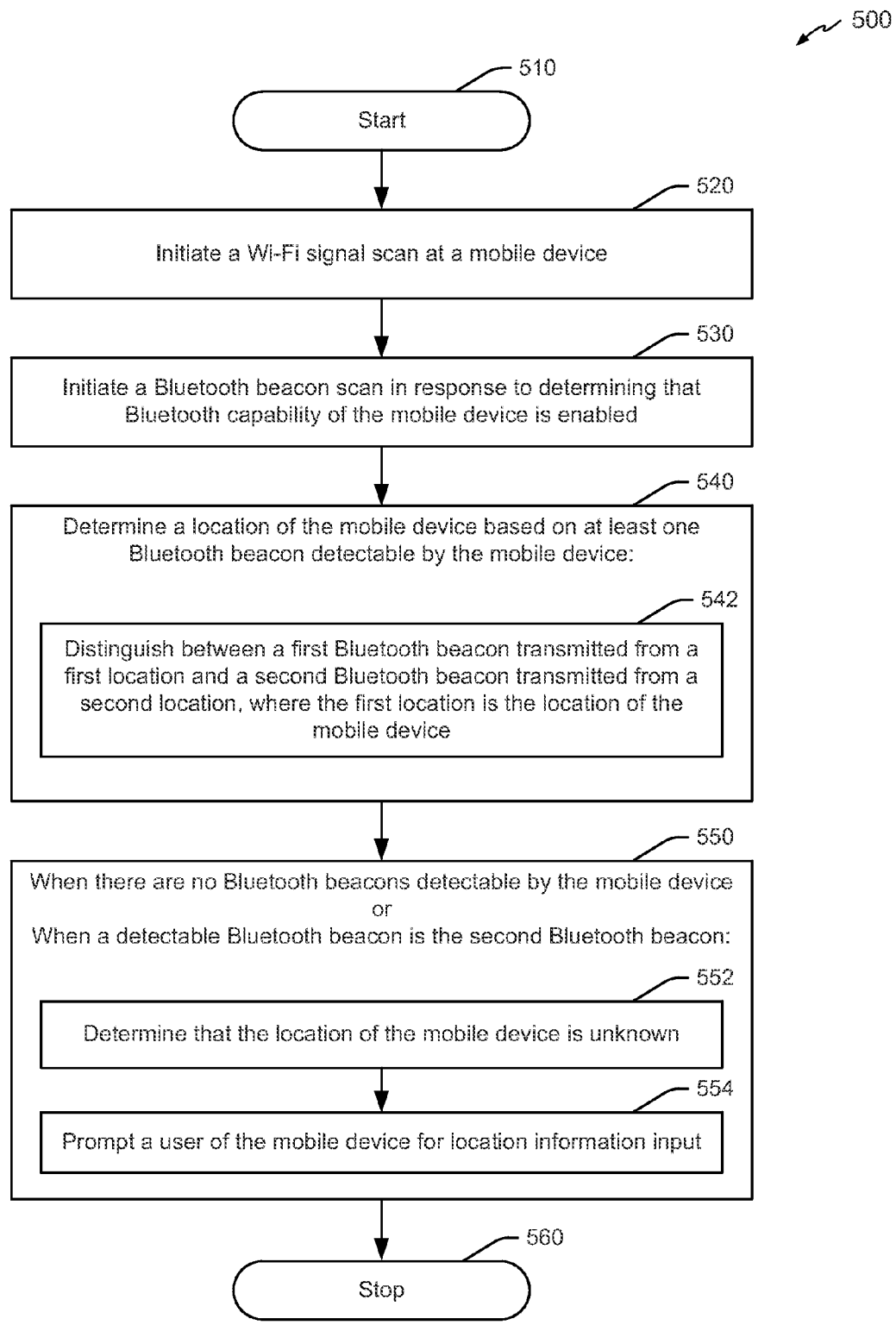
FIG. 5 is a flowchart for implementing a Bluetooth beacon based location determination, according to one example.

FIG. 5 is a flowchart of an example of a method 500 for implementing a Bluetooth beacon based location determination at a mobile device. Method 500 may be implemented in the form of executable instructions stored on a non-transitory machine-readable storage medium and/or in the form of electronic circuitry.

Method 500 may start in block 510 and proceed to block 520, where a Wi-Fi signal scan is initiated at a mobile device. For example, the Wi-Fi module 236 of the mobile device 106 may initiate a Wi-Fi signal scan. The method may proceed to block 530, where a Bluetooth beacon scan is initiated responsive to determining that Bluetooth capability of the mobile device is enabled. For example, the Bluetooth module 206 may be enabled to perform a beacon scan for Bluetooth beacons within range of the mobile device 106.

Method 500 may proceed to block 540, where a location of the mobile device is determined based on at least one Bluetooth beacon detectable by the mobile device. Block 540 may also include block 542, where a first Bluetooth beacon transmitted from a first location is distinguished from a second Bluetooth beacon transmitted from a second location, where the first location is the location of the mobile device. For example, the location of the mobile device 106 may be determined by distinguishing or discriminating between a first Bluetooth beacon from the same location (e.g., the same room) as the mobile device and a second Bluetooth beacon (e.g., a penetrating Bluetooth beacon) from a different location (e.g., a neighboring or adjacent room) from the mobile device. Detailed operation of block 542 (i.e., distinguishing between the first Bluetooth beacon and the second Bluetooth beacon) is described in further details with reference to FIG. 6.

Method 500 may proceed to block 550, where it is determined that there are no Bluetooth beacons detectable by the mobile device or where a detectable Bluetooth beacons is determined to be the second Bluetooth beacon. Block 550 includes block 552, where it is determined that the location of the mobile device is unknown, and block 544, where a user of the mobile device is prompted for location information input. For example, if no Bluetooth beacon is within a range of the mobile device 106 or if the Bluetooth beacon detected is the second Bluetooth beacon transmitting from the second location, the location determining module 216 determines that the location of the mobile device 106 is unknown and prompts the user of the mobile device 106 for location input via the user interface 226. Method 500 may then proceed to block 560, where the method 500 stops.

Figure 6:
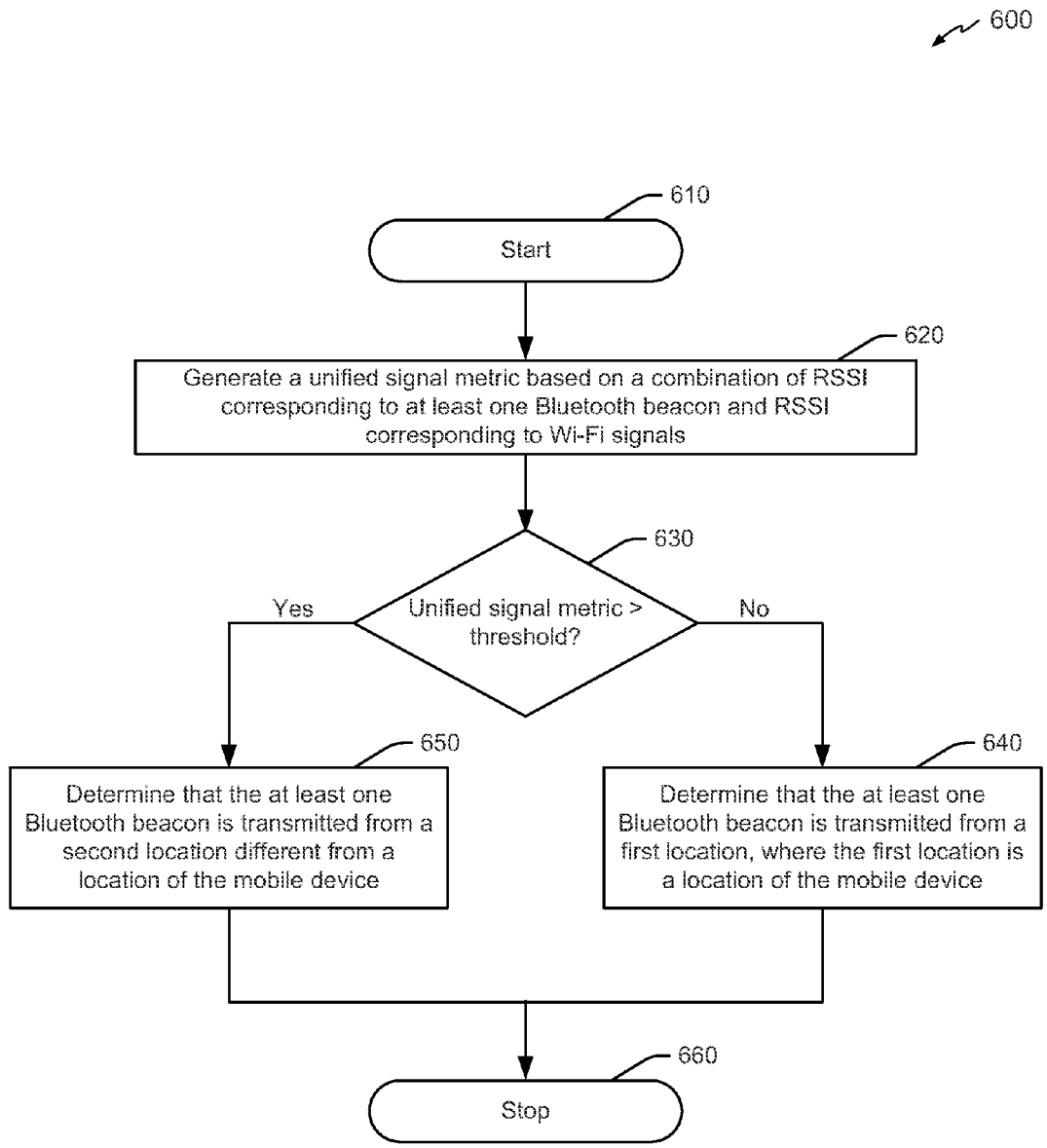
FIG. 6 is a flowchart for implementing a Bluetooth beacon based location determination using a unified signal metric, according to one example.

FIG. 6 is a flowchart of an example of a method 600 for implementing a Bluetooth beacon based location determination using a unified signal metric, according to one example. Method 600 may be implemented in the form of executable instructions stored on a non-transitory machine-readable storage medium and/or in the form of electronic circuitry.

Method 600 may start in block 610 and proceed to block 620, where a unified signal metric is generated based on a combination of at least one Bluetooth beacon RSSI and Wi-Fi RSSI. For example, RSSI data may be extracted from at least one received Bluetooth beacon. Similarly RSSI data may be extracted from at least one received Wi-Fi signal. Alternately, or in addition, the at least one received Bluetooth beacon may include Wi-Fi fingerprints and/or observations. The Bluetooth RSSI and the Wi-Fi RSSI are combined to form a unified signal metric usable for distinguishing between a penetrating Bluetooth beacon and a Bluetooth beacon transmitted from the same room as the mobile device 106.

Method 600 may proceed to block 630, where it is determined whether the unified signal metric is greater than a threshold. If the unified signal metric is not greater than the threshold, the method 600 may proceed to block 640 where it is determined that the at least one received Bluetooth beacon is transmitted from a first location, where the first location is the location of the mobile device. If, however, the unified signal metric is greater than the threshold, the method 600 may proceed to block 650, where it is determined that the at least one received Bluetooth beacon is transmitted from a second location different from the location of the mobile device. The method 600 may then proceed to block 680, where the method 600 stops.

Figure 7:
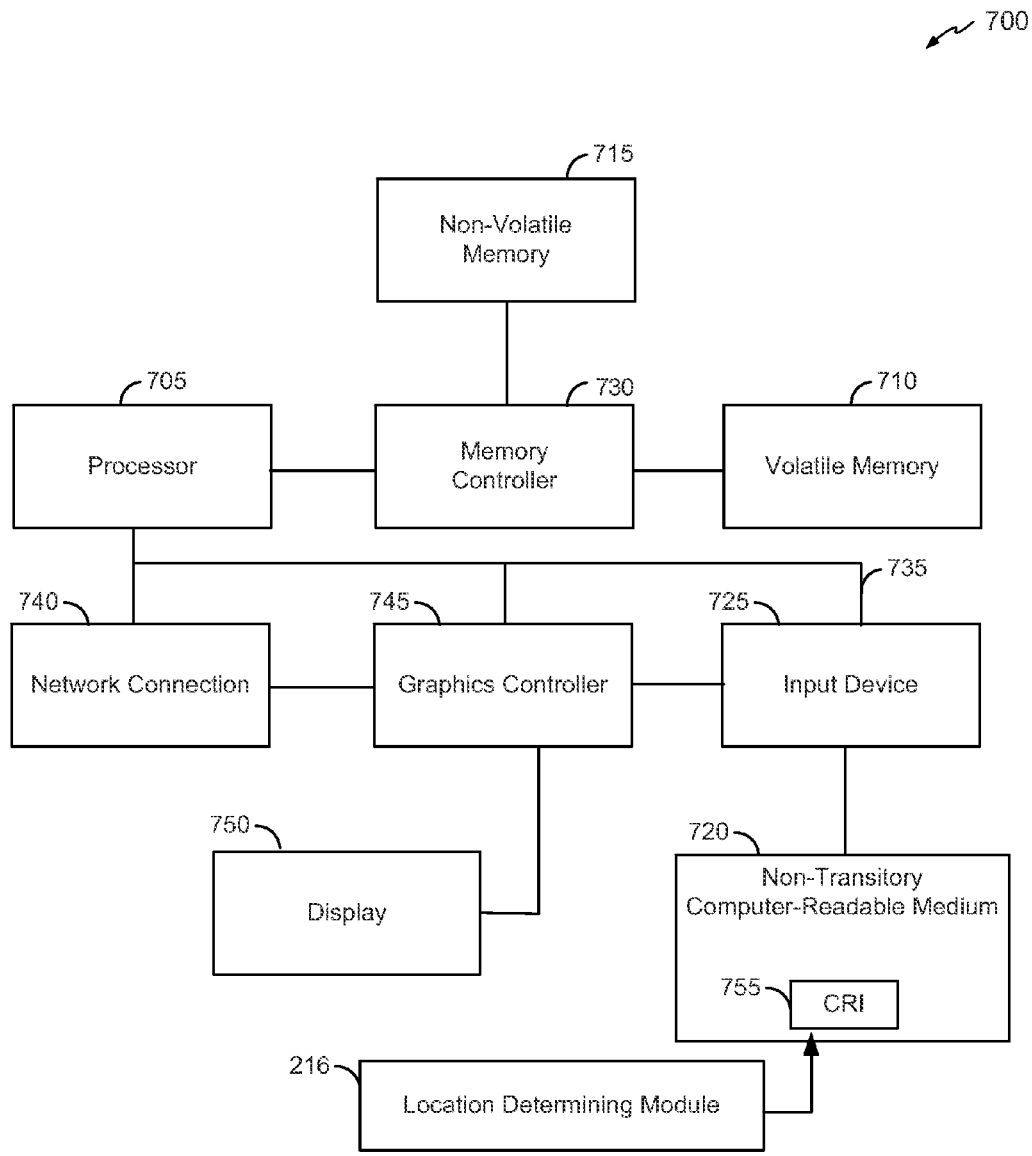
FIG. 7 is a block diagram of an example component for implementing the mobile device of FIGS. 2 and 3, according to various examples.

The location determining module 216 of FIGS. 2-4 can be implemented in hardware, software, or a combination of both. FIG. 7 illustrates a component for implementing the location determining module 216 according to various examples. The component 700 can include a processor 705 and memory resources, such as, for example, the volatile memory 710 and/or the non-volatile memory 715, for executing instructions stored in a tangible non-transitory medium (e.g., volatile memory 710, non-volatile memory 715, and/or computer readable medium 720). The non-transitory computer-readable medium 720 can have computer-readable instructions 755 stored thereon that are executed by the processor 705 to implement a network controller that utilizes client mobile devices for wireless network monitoring according the present disclosure.

A machine (e.g., a computing device) can include and/or receive a tangible non-transitory computer-readable medium 720 storing a set of computer-readable instructions (e.g., software) via an input device 725. As used herein, the processor 705 can include one or a plurality of processors such as in a parallel processing system. The memory can include memory addressable by the processor 705 for execution of computer readable instructions. The computer readable medium 720 can include volatile and/or non-volatile memory such as a random access memory ("RAM"), magnetic memory such as hard disk, floppy disk, and/or tape memory, a solid state drive ("SSD"), flash memory, phase change memory, and so on. In some examples, the non-volatile memory 715 can be a local or remote database including a plurality of physical non-volatile memory devices.

The processor 705 can control the overall operation of the component 700. The processor can be connected to a memory controller 730, which can read and/or write data from and/or to volatile memory 710 (e.g., RAM). The processor 705 can be connected to a bus 735 to provide communication between the processor 705, the network connection 740, and other portions of the component 700. The non-volatile memory 715 can provide persistent data storage for the component 700. Further, the graphics controller 745 can connect to an optical display 750.

Each component 700 can include a computing device including control circuitry such as a processor, a state machine, ASIC, controller, and/or similar machine. As used herein, the indefinite articles "a" and/or "an" can indicate one or more of the named objects. Thus, for example, "a processor" can include one or more than one processor, such as in a multi-core processor, cluster, or parallel processing arrangement.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. For example, it is appreciate that the present disclosure is not limited to a particular configuration, such as component 700.

Those skilled in the art would further appreciate that the various illustrative modules and steps described in connection with the examples disclosed herein may be implemented as electronic hardware, computer software, or combination of both. For example, the steps of FIGS. 5 and 6 may be implemented using software modules, hardware modules or components, or a combination of software and hardware modules or components. Thus, in one example, one or more of the steps of FIGS. 5 and 6 may comprise hardware modules or components. In another example, one or more of the steps of FIGS. 5 and 6 may comprise software code stored on a computer readable storage medium, which is executable by a processor.

To clearly illustrate this interchangeability of hardware and software, various illustrative components, blocks, modules, and steps have been described above generally in terms of their functionality (e.g., location determining module 216). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A method comprising:
    initiating a Wi-Fi signal scan at a mobile device to generate Wi-Fi signal metrics corresponding to a plurality of Wi-Fi signals detectable by the mobile device;
    initiating a Bluetooth beacon scan to generate Bluetooth beacon metrics corresponding to at least one Bluetooth beacon detectable by the mobile device, in response to determining that Bluetooth capability of the mobile device is enabled;
    generating a unified signal metric based on a combination of the Wi-Fi signal metrics and the Bluetooth beacon metrics, the unifying signal metric including a received signal strength indicator (RSSI) of Bluetooth beacons and a Wi-Fi fingerprint carried by the Bluetooth beacons; and
    determining a location of the mobile device using the unified signal metric.

2. The method of claim 1, wherein determining the location of the mobile device comprises:
    distinguishing between a first Bluetooth beacon transmitted from a first location and a second Bluetooth beacon transmitted from a second location using the unified signal metric, wherein the first location is the location of the mobile device, and wherein the second location is different from the location of the mobile device; and
    when there are no Bluetooth beacons detectable by the mobile device or when the at least one detectable Bluetooth beacon is the second Bluetooth beacon:
        determining that the location of the mobile is unknown; and
        prompting a user of the mobile device for location information input.

3. The method of claim 2, wherein distinguishing between the first Bluetooth beacon and the second Bluetooth beacon using the unified signal metric comprises:
    when the unified signal metric exceeds a threshold, determining that the at least one Bluetooth beacon is transmitted from the second location; and
    when the unified signal metric is less than or equal to the threshold, determining that the at least one Bluetooth beacon is transmitted from the first location,
    wherein the Wi-Fi signal metrics and the Bluetooth beacon metrics each comprise received signal strength indicator (RSSI).

4. The method of claim 2, wherein the first location is a current room of the mobile device and wherein the second location is a neighboring room of the mobile device.

5. The method of claim 2, comprising:
    sending at least one of the Bluetooth beacon based location information and the user input based location information to a server; and generating a signal map based on the Bluetooth beacon based location information and the user input based location information, wherein the signal map is usable for locating a plurality of mobile devices.

6. The method of claim 2, comprising:
encoding at least one of the Bluetooth beacon based location information and the user input based location information of the mobile device into a Bluetooth beacon; and
broadcasting the Bluetooth beacon when Bluetooth capability is enabled.

7. The method of claim 6, comprising:
periodically performing the Wi-Fi signal scan to obtain current Wi-Fi signal metrics;
comparing the current Wi-Fi signal metrics to historical Wi-Fi signal metrics;
determining a change in location of the mobile device when a difference between the current Wi-Fi signal metrics and the historical signal metrics exceeds a threshold; and
refraining from broadcasting the Bluetooth beacon until a new location of the mobile device is determined.

8. The method of claim 1, wherein the at least one Bluetooth beacon comprises location information transmitted from at least one Bluetooth device and wherein the Wi-Fi signals are associated with a plurality of Wi-Fi access points detectable by the mobile device.

9. The method of claim 1, comprising determining the location of the mobile device based on the Wi-Fi signal metrics, in response to determining that the Bluetooth capability is disabled.

10. The method of claim 1, wherein determining the location of the mobile device further comprises:
dividing the RSSI into three ranges; and
assigning a penalty value to each of the three ranges for space discrimination.

11. The method of claim 1, further comprising calculating RMSE distance from the mobile device to the Bluetooth beacon.

12. The method of claim 1, wherein the unified metric is defined by $$U_{ob} = (1 + p_b) \cdot \left( \frac{-RSSI_b - 50}{N} \right) + (1 + p_w) \cdot (D_{ob})$$

where $U_{ob}$ is unified distance from observation o to beacon fingerprint b, $RSSI_b$ is an RSSI value extracted from beacon b, $D_{ob}$ is RMSE distance from observation o to beacon fingerprint b, $p_b$ is penalty value given to beacon RSSI component, pw is a penalty value given to Wi-Fi RMSE component $D_{ob}$, and N is a constant for normalizing $RSSI_b$ to the same scale as $D_{ob}$.

13. A system comprising:
a Wi-Fi module to initiate a Wi-Fi signal scan at a mobile device to generate received signal strength indicator (RSSI) corresponding to a plurality of detectable Wi-Fi access points (APs);
a Bluetooth module to initiate a Bluetooth beacon scan at the mobile device to generate RSSI corresponding to at least one detectable Bluetooth beacon; and
a location determining module to:
generate a unified signal metric based on a combination of the RSSI for the APs and the RSSI for the at least one Bluetooth beacon, the unifying signal metric including both the RSSI of Bluetooth beacons and a Wi-Fi fingerprint carried by the Bluetooth beacons;
determine that the at least one Bluetooth beacon is transmitted from a first location when the unified signal metric is less than or equal to a threshold; and
determine that the at least one Bluetooth beacon is transmitted from a second location when the unified signal metric exceeds the threshold,
wherein the first location is the location of the mobile device, and wherein the second location is not the location of the mobile device.

14. The system of claim 13, the location determining module to:
prompt a user of the mobile device for location information input in response to determining that no Bluetooth beacons are detectable by the Bluetooth module or that the at least one Bluetooth beacon detected is transmitted from the second location.

15. The system of claim 14, the location determining module to:
send location information of the mobile device to a server, wherein the location information includes at least one of the Bluetooth beacon location information and the user input location information, and
wherein the location information includes collected Wi-Fi observations usable for generating a signal map for determining location of a plurality of mobile devices.

16. The system of claim 14, the location determining module to:
encode the location information of the mobile device into a Bluetooth beacon; and
broadcast the Bluetooth beacon,
wherein the location information comprises at least one of the Bluetooth beacon location information and the user input location information.

17. The system of claim 13, wherein the at least one Bluetooth beacon includes Wi-Fi fingerprint information, wherein the Wi-Fi fingerprint information includes a signal map based on RSSI data corresponding to the plurality of Wi-Fi APs.

18. The system of claim 13, wherein the unified metric discriminates between a penetrating beacon between the first location and the second location, wherein the first location is a current room of the mobile device and wherein the second location is at least one of a neighboring room of the mobile device and an adjacent room to the mobile device.

19. The system of claim 13, the location determining module to determine the location of the mobile device based on the RSSI corresponding to the Wi-Fi access points, when the Bluetooth module is disabled.

20. The system of claim 13, wherein the mobile device comprises at least one of a smartphone, a mobile phone, a personal digital assistant (PDA), a portable personal computer, a desktop computer, a multimedia player, an entertainment unit, a data communication device, and a portable reading device equipped with a Bluetooth module and a Wi-Fi module.

21. A non-transitory computer readable medium comprising instructions that, when executed by a processor, cause the processor to:
initiate a Wi-Fi scan at a made device to generate Wi-Fi signal metrics;
initiate a Bluetooth beacon scan at the mobile device to generate Bluetooth beacon signal metrics;
generate a unified signal metric based on a combination of a received signal strength indicator (RSSI) of Bluetooth beacons and a Wi-Fi fingerprint carried by the Bluetooth beacons; and determine a location of the mobile device based on the unified signal metric,
- wherein the Bluetooth beacon is determined to be transmitted from a first location when the unified signal metric is less than or equal to a threshold,
- wherein the Bluetooth beacons is determined to be transmitted from a second location when the unified signal metrics exceeds the threshold,
- wherein the first location is the location of the mobile device, and
- wherein the second location is different from the location of the mobile device.

22. The non-transitory computer readable medium of claim 21, comprising instructions executable by the processor to:
- generate a location input prompt at a user interface of the mobile device in response to determining that no Bluetooth beacon is detectable by the mobile device or that the detectable Bluetooth beacon is transmitted from the second location,
- wherein the Bluetooth beacon includes Wi-Fi signal metrics.

23. The non-transitory computer readable medium of claim 22, comprising instructions executable by the processor to:
- send location information of the mobile device to a server,
  Wherein the location information includes at least one of the location determined based on the unified signal metric and the location determined based on the user input;
- encode the location information into a new Bluetooth beacon; and
- broadcast the new Bluetooth beacon.

* * * * *

UNITED STATES PATENT AND TRADEMARK OFFICE
CERTIFICATE OF CORRECTION

| | |
|---|---|
| PATENT NO. | : 8,965,398 B2 |
| APPLICATION NO. | : 13/627982 |
| DATED | : February 24, 2015 |
| INVENTOR(S) | : Jindan Zhu et al. |

It is certified that error appears in the above-identified patent and that said Letters Patent is hereby corrected as shown below:

In the Claims

In column 14, line 60, in Claim 21, delete "made" and insert -- mobile --, therefor.

In column 15, line 25, in Claim 23, delete "Wherein" and insert -- wherein --, therefor.

Signed and Sealed this
Thirtieth Day of June, 2015

Michelle K. Lee
*Director of the United States Patent and Trademark Office*